US010718283B2

(12) United States Patent
Braun (10) Patent No.: US 10,718,283 B2
(45) Date of Patent: *Jul. 21, 2020

(54) COMBINED IDENTIFICATION OF AN INLET VALVE STROKE PHASE DIFFERENCE AND AN OUTLET VALVE STROKE PHASE DIFFERENCE OF AN INTERNAL COMBUSTION ENGINE WITH THE AID OF LINES OF THE SAME AMPLITUDE (71) Applicant: CPT Group GmbH, Hannover (DE)

(72) Inventor: Tobias Braun, Undorf (DE)

(73) Assignee: VITESCO TECHNOLOGIES GMBH, Hannover (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/338,552

(22) PCT Filed: Aug. 10, 2017

(86) PCT No.: PCT/EP2017/070315
§ 371 (c)(1),
(2) Date: Apr. 1, 2019

(87) PCT Pub. No.: WO2018/068922
PCT Pub. Date: Apr. 19, 2018

(65) Prior Publication Data
US 2020/0040829 A1 Feb. 6, 2020

(30) Foreign Application Priority Data
Oct. 10, 2016 (DE) .......................... 10 2016 219 582

(51) Int. Cl.
F02D 41/00 (2006.01)
F01L 1/344 (2006.01)
(Continued)

(52) U.S. Cl.
CPC ............ *F02D 41/009* (2013.01); *F01L 1/344* (2013.01); *F02D 13/0219* (2013.01);
(Continued)

(58) Field of Classification Search
CPC . F01L 1/344; F01L 13/0015; F01L 2013/113; F01L 2013/115; F01L 2201/00;
(Continued)

(56) References Cited

U.S. PATENT DOCUMENTS 5,889,205 A 3/1999 Treinies et al. ............ 73/114.32
6,804,997 B1 10/2004 Schwulst ................... 73/114.37
(Continued)

FOREIGN PATENT DOCUMENTS

DE 3506114 A1 9/1986 ............. F02D 41/14
DE 102005007057 A1 8/2006 ............. F02D 41/18
(Continued)

OTHER PUBLICATIONS

German Office Action, Application No. 102016219582.4, 5 pages, dated Jan. 16, 2017.
(Continued)

Primary Examiner — Jorge L Leon, Jr.
(74) Attorney, Agent, or Firm — Slayden Grubert Beard PLLC (57) ABSTRACT Various embodiments include a method for identifying an inlet and an outlet valve stroke phase difference comprising: measuring pressure oscillations during operation; generating a corresponding signal; determining a corresponding crankshaft phase angle; applying a discrete Fourier transformation to the pressure signal to determine amplitudes of selected frequencies in relation to the crankshaft phase angle; determining lines of equal amplitudes of the frequencies based on the amplitudes depending on the phase differences using reference lines; determining an intersection of the lines by
(Continued)

projection into a common plane; and determining the inlet valve stroke phase difference and the outlet valve stroke phase difference from the determined common intersection point of the lines of equal amplitudes of the selected signal frequencies.

11 Claims, 6 Drawing Sheets

(51) Int. Cl.
*F02D 13/02* (2006.01)
*F02D 41/14* (2006.01)
*F02D 41/24* (2006.01)
*F02D 41/28* (2006.01)
*F01L 1/047* (2006.01)

(52) U.S. Cl.
CPC ..... *F02D 41/1401* (2013.01); *F02D 41/2464* (2013.01); *F02D 41/28* (2013.01); *F01L 1/047* (2013.01); *F01L 2001/34496* (2013.01); *F01L 2800/14* (2013.01); *F01L 2820/041* (2013.01); *F01L 2820/042* (2013.01); *F01L 2820/043* (2013.01); *F02D 2041/1433* (2013.01); *F02D 2041/288* (2013.01); *F02D 2200/024* (2013.01); *F02D 2200/0406* (2013.01)

(58) Field of Classification Search
CPC ............... F01L 2800/09; F01L 2800/14; F01L 2800/18; F01L 2820/042; F01L 2820/043; F02D 13/0219; F02D 41/009; F02D 2041/1433; F02D 41/1448; F02D 41/2432; F02D 2041/288; F02D 2200/0406

USPC ...................................................... 123/90.15
See application file for complete search history.

(56) References Cited

U.S. PATENT DOCUMENTS

| | | | |
|---|---|---|---|
| 2009/0312932 A1 | 12/2009 | Wang et al. | ................... 701/102 |
| 2010/0063775 A1 | 3/2010 | Colling | ........... 702/182 |
| 2017/0198649 A1 | 7/2017 | Kainz et al. | |
| 2018/0051598 A1* | 2/2018 | Pedro | ....................... B60K 6/48 |

FOREIGN PATENT DOCUMENTS

| | | | | |
|---|---|---|---|---|
| DE | 102008052245 A1 | 4/2010 | ............. | F02D 41/00 |
| DE | 102012212860 B3 | 12/2013 | .............. | F01M 1/00 |
| DE | 102015209665 A1 | 12/2015 | ............. | F02D 41/00 |
| WO | 96/32579 A1 | 10/1996 | ............. | F02D 41/04 |
| WO | 2018/068922 A1 | 4/2018 | ............. | F01L 13/00 |
| WO | 2018/068923 A1 | 4/2018 | ............. | F01L 13/00 |

OTHER PUBLICATIONS

German Office Action, Application No. 102016219584.0, 8 pages, dated May 29, 2017.
International Search Report and Written Opinion, Application No. PCT/EP2017/070339, 13 pages, dated Nov. 21, 2017.
International Search Report and Written Opinion, Application No. PCT/EP2017/070315, 13 pages, dated Nov. 21, 2017.

* cited by examiner

COMBINED IDENTIFICATION OF AN INLET VALVE STROKE PHASE DIFFERENCE AND AN OUTLET VALVE STROKE PHASE DIFFERENCE OF AN INTERNAL COMBUSTION ENGINE WITH THE AID OF LINES OF THE SAME AMPLITUDE

CROSS-REFERENCE TO RELATED APPLICATIONS

This application is a U.S. National Stage Application of International Application No. PCT/EP2017/070315 filed Aug. 10, 2017, which designates the United States of America, and claims priority to DE Application No. 10 2016 219 582.4 filed Oct. 10, 2016, the contents of which are hereby incorporated by reference in their entirety.

TECHNICAL FIELD

The present disclosure relates to internal combustion engines. Various embodiments may include methods by means of which phase differences of the valve stroke of the inlet valves and of the outlet valves of a reciprocating-piston internal combustion engine during operation can be identified in combined form through evaluation of dynamic pressure oscillations of the intake air, which oscillations are measured in the air intake tract.

BACKGROUND

Reciprocating-piston internal combustion engines, which will hereinafter also be referred to in shortened form merely as internal combustion engines, have one or more cylinders in which in each case one reciprocating piston is arranged. To illustrate the principle of a reciprocating-piston internal combustion engine, reference will be made below to FIG. 1, which illustrates by way of example a cylinder of an internal combustion engine, which is possibly also a multi-cylinder internal combustion engine, together with the most important functional units. The respective reciprocating piston 6 is arranged in linearly movable fashion in the respective cylinder 2 and, together with the cylinder 2, encloses a combustion chamber 3.

Figure 1:
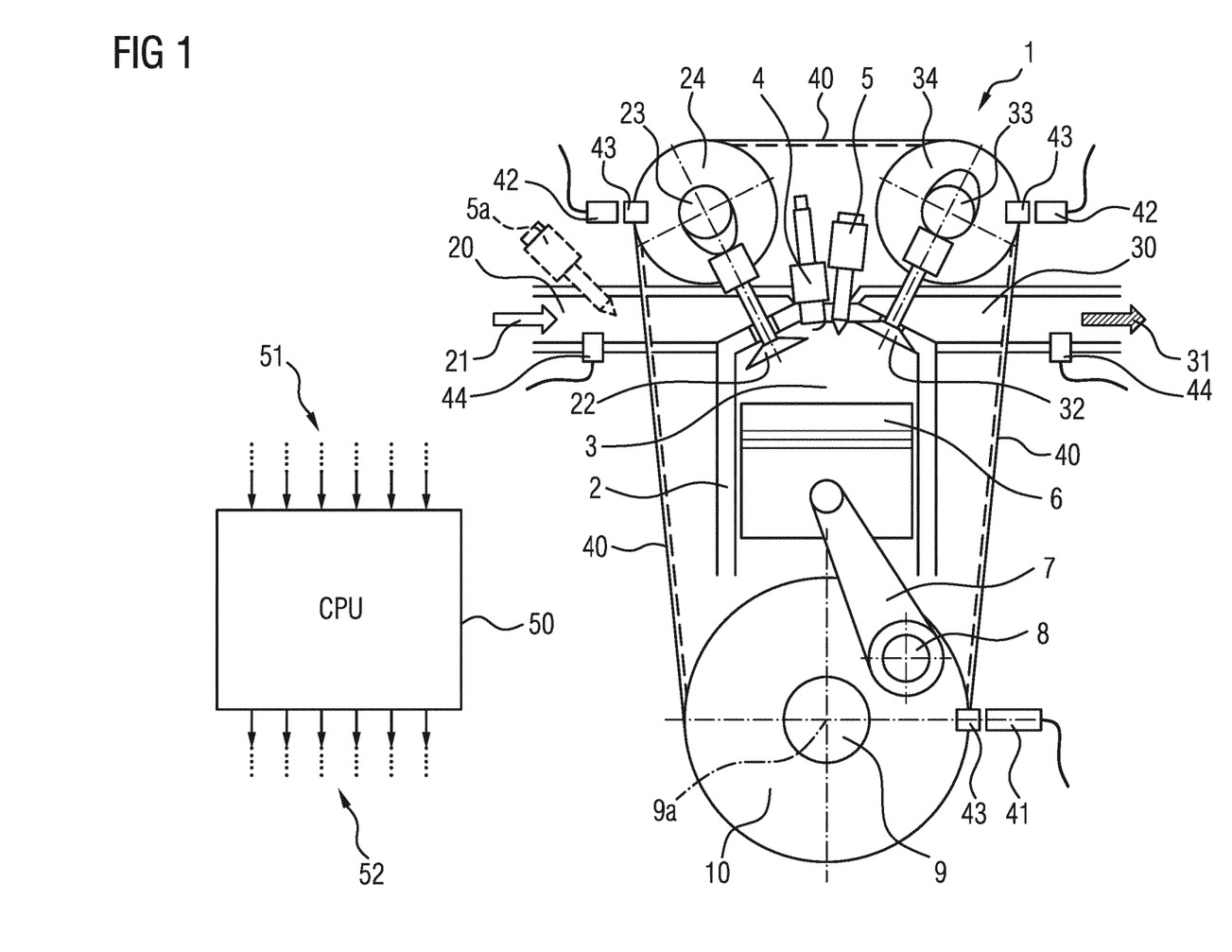
FIG. 1 shows a simplified schematic drawing of a reciprocating-piston internal combustion engine.

The respective reciprocating piston 6 is connected by means of a so-called connecting rod 7 to a respective crankpin 8 of a crankshaft 9, wherein the crankpin 8 is arranged eccentrically with respect to the crankshaft axis of rotation 9a. As a result of the combustion of a fuel-air mixture in the combustion chamber 3, the reciprocating piston 6 is driven linearly "downward". The translational stroke movement of the reciprocating piston 6 is transmitted by means of the connecting rod 7 and crankpin 8 to the crankshaft 9 and is converted into a rotational movement of the crankshaft 9, which causes the reciprocating piston 6, after it passes through a bottom dead center in the cylinder 2, to be moved "upward" again in the opposite direction as far as a top dead center. To permit continuous operation of the internal combustion engine 1, during a so-called working cycle of a cylinder 2, it is necessary firstly for the combustion chamber 3 to be filled with the fuel-air mixture, for the fuel-air mixture to be compressed in the combustion chamber 3 and to then be ignited and burned in order to drive the reciprocating piston 6, and finally for the exhaust gas that remains after the combustion to be discharged from the combustion chamber 3. Continuous repetition of this sequence results in continuous operation of the internal combustion engine 1, with work being output in a manner proportional to the combustion energy.

Depending on the engine concept, a working cycle of the cylinder is divided into two strokes distributed over one crankshaft rotation (360°) (two-stroke engine) or into four strokes distributed over two crankshaft rotations (720°) (four-stroke engine). To date, the four-stroke engine has become established as a drive for motor vehicles. In an intake stroke, with a downward movement of the reciprocating piston 6, fuel-air mixture or else only fresh air (in the case of fuel direct injection) is introduced from the air intake tract 20 into the combustion chamber 3. During the following compression stroke, with an upward movement of the reciprocating piston 6, the fuel-air mixture or the fresh air is compressed in the combustion chamber 3, and if appropriate fuel is separately injected by means of an injection valve 5, which belongs to a fuel supply system, directly into the combustion chamber 3. During the following working stroke, the fuel-air mixture is ignited by means of an ignition plug 4, burns with an expanding action and expands, outputting work, with a downward movement of the reciprocating piston 6. Finally, in an exhaust stroke, with another upward movement of the reciprocating piston 6, the remaining exhaust gas is discharged out of the combustion chamber 3 into the exhaust-gas outlet tract 30.

The delimitation of the combustion chamber 3 with respect to the air intake tract 20 or exhaust-gas outlet tract 30 of the internal combustion engine is realized generally, and in particular in the example taken as a basis here, by means of inlet valves 22 and outlet valves 32. In the current state of the art, said valves are actuated by means of at least one camshaft. The example shown has an inlet camshaft 23 for actuating the inlet valves 22 and has an outlet camshaft 33 for actuating the outlet valves 32. There are normally yet further mechanical components (not illustrated here) for force transmission provided between the valves and the respective camshaft, which components may also include a valve play compensation means (e.g. bucket tappet, rocker lever, finger-type rocker, tappet rod, hydraulic tappet etc.).

The inlet camshaft 23 and the outlet camshaft 33 are driven by means of the internal combustion engine 1 itself. For this purpose, the inlet camshaft 23 and the outlet camshaft 33, in each case by means of suitable inlet camshaft control adapters 24 and outlet camshaft control adapters 34, such as for example toothed gears, sprockets or belt pulleys, and with the aid of a control mechanism 40, which has for example a toothed gear mechanism, a control chain or a toothed control belt, are coupled, in a predefined position with respect to one another and with respect to the crankshaft 9 by means of a corresponding crankshaft control adapter 10, which is correspondingly formed as a toothed gear, sprocket or belt pulley, to the crankshaft 9. By means of this connection, the rotational position of the inlet camshaft 23 and of the outlet camshaft 33 in relation to the rotational position of the crankshaft 9 is, in principle, defined. By way of example, FIG. 1 illustrates the coupling between inlet camshaft 23 and the outlet camshaft 33 and the crankshaft 9 by means of belt pulleys and a toothed control belt.

The rotational angle covered by the crankshaft during one working cycle will hereinafter be referred to as working phase or simply as phase. A rotational angle covered by the crankshaft within one working phase is accordingly referred to as phase angle. The respectively current crankshaft phase angle of the crankshaft 9 can be detected continuously by means of a position encoder 43 connected to the crankshaft 9, or to the crankshaft control adapter 10, and an associated crankshaft position sensor 41. Here, the position encoder may be formed for example as a toothed gear with a multiplicity of teeth arranged so as to be distributed equidistantly over the circumference, wherein the number of individual teeth determines the resolution of the crankshaft phase angle signal. It is likewise additionally possible, if appropriate, for the present phase angles of the inlet camshaft 23 and of the outlet camshaft 33 to be detected continuously by means of corresponding position encoders 43 and associated camshaft position sensors 42.

Since, owing to the predefined mechanical coupling, the respective crankpin 8, and with the latter the reciprocating piston 6, the inlet camshaft 23, and with the latter the respective inlet valve 22, and the outlet camshaft 33, and with the latter the respective outlet valve 32, move in a predefined relationship with respect to one another and in a manner dependent on the crankshaft rotation, said functional components run through the respective working phase synchronously with respect to the crankshaft. The respective rotational positions and stroke positions of reciprocating piston 6, inlet valves 22 and outlet valves 32 can thus, taking into consideration the respective transmission ratios, be set in relation to the crankshaft phase angle of the crankshaft 9 predefined by the crankshaft position sensor 41. In an ideal internal combustion engine, it is thus possible for every particular crankshaft phase angle to be assigned a particular crankpin angle HZW (FIG. 2), a particular piston stroke, a particular inlet camshaft angle and thus a particular inlet valve stroke and also a particular outlet camshaft angle and thus a particular outlet valve stroke. That is to say, all of the stated components are, or move, in phase with the rotating crankshaft 9.

In modern internal combustion engines 1, it is however possible for additional positioning elements to be provided within the mechanical coupling path between crankshaft 9 and inlet camshaft 23 and the outlet camshaft 33, for example in a manner integrated into the inlet camshaft adapter 24 and the outlet camshaft adapter 34, which positioning elements effect a desired controllable phase shift between the crankshaft 9 and inlet camshaft 23 and the outlet camshaft 33. These are known as so-called phase adjusters in so-called variable valve drives. Also symbolically illustrated is an electronic programmable engine control unit 50 (CPU), which is equipped with signal inputs, for receiving the various sensor signals, and with signal and power outputs, for the actuation of corresponding positioning units and actuators for controlling the engine functions.

For optimum operation of the internal combustion engine (with regard to emissions, consumption, power, running smoothness etc.), the fresh-gas charge introduced into the combustion chamber during the intake stroke should be known with the best possible accuracy in order to enable the further parameters for the combustion, such as for example the fuel quantity which is to be supplied, and which is possibly directly injected, to be coordinated therewith. The so-called charge exchange, that is to say the intake of fresh gas and the discharge of the exhaust gas, is in this case highly dependent on the control timing of the inlet valves 22 and outlet valves 32, that is to say on the profile with respect to time of the respective valve strokes in relation to the profile with respect to time of the piston stroke. In other words, during operation, the charge exchange is dependent on the phase positions of the inlet and outlet valves in relation to the crankshaft phase angle and thus in relation to the phase position of the reciprocating piston.

For the determination of the fresh-gas charge and for coordinating the control parameters of the internal combustion engine therewith, the prior art involves performing measurement on a so-called reference internal combustion engine in all occurring operating states, for example in a manner dependent on the rotational speed, the load, possibly the valve control timing predefinable by means of phase adjusters, possibly the operating parameters of exhaust-gas turbochargers or superchargers etc., and storing said measurement values, or derivatives thereof, or models reflecting the characteristics, on the engine control unit of a corresponding series-production internal combustion engine. All structurally identical, series-production internal combustion engines of the same type series are then operated with this reference dataset that is generated.

A deviation, resulting for example from manufacturing tolerances, of the actual relative positions between inlet and outlet valves and the crankshaft phase angle or the reciprocating-piston position of a series-production internal combustion engine in relation to the ideal reference positions of the reference internal combustion engine, that is to say a phase difference of the inlet valve stroke, of the outlet valve stroke and possibly of the piston stroke in relation to the phase angle predefined by the crankshaft position sensor, or the phase position of the crankshaft, has the effect that the fresh-gas charge actually drawn in deviates from the fresh-gas charge determined as a reference, and thus the control parameters based on the reference dataset are not optimum. During the operation of the internal combustion engine, these errors can have adverse effects with regard to emissions, consumption, power, running smoothness etc.

Figure 2:
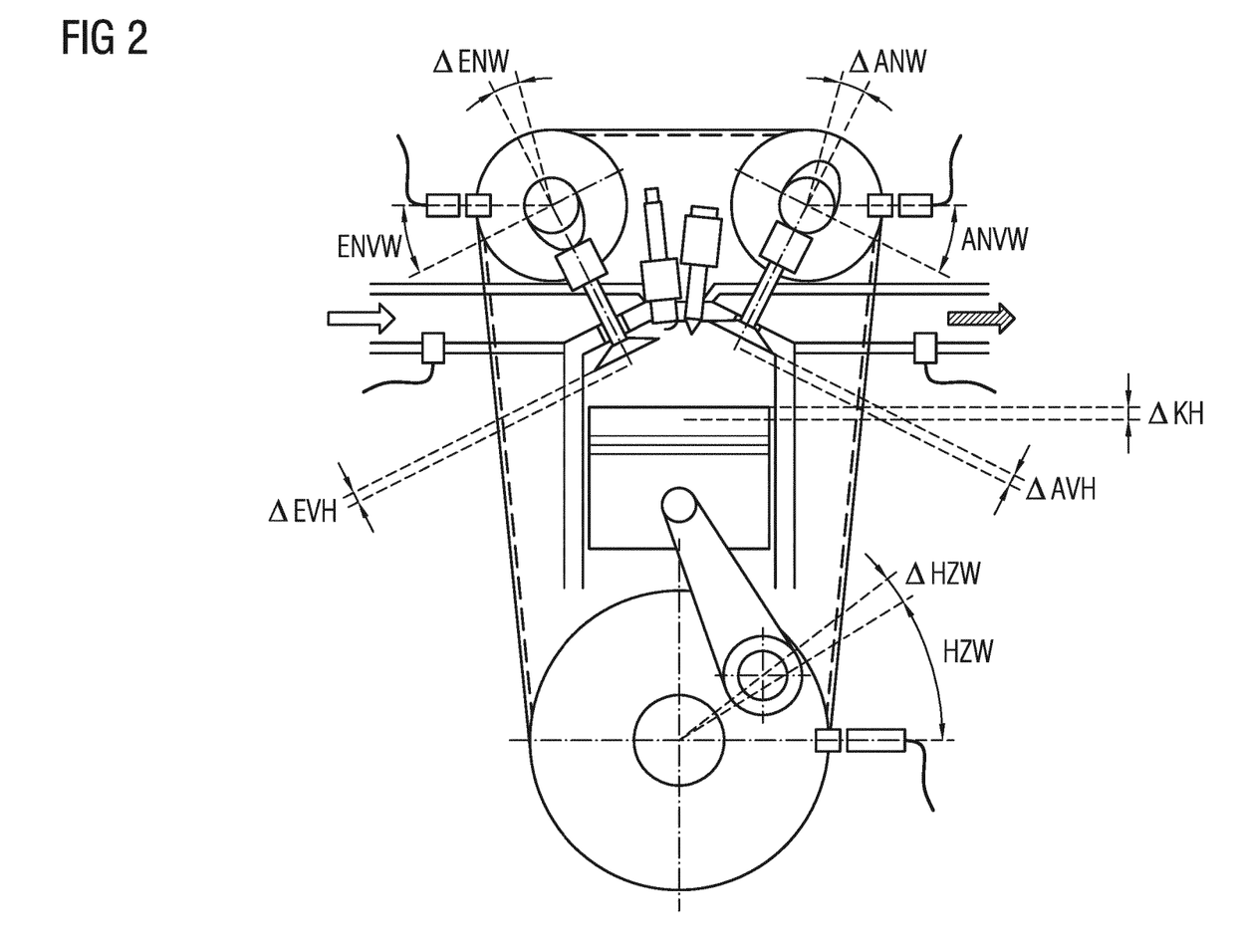
FIG. 2 shows the schematic diagram as per FIG. 1, with labelling of the possible position and angle deviations of significant components of the reciprocating-piston internal combustion engine.

For the illustration of the possible deviations that occur in a series-production internal combustion engine, and for the definition of the nomenclature of said deviations, reference will be made below to FIG. 2, which shows the internal combustion engine from FIG. 1 but in which, for a better overview, the reference designations illustrated in FIG. 1 have been omitted and only the corresponding deviations are designated. Proceeding from a reference position of the position encoder 43 arranged on the crankshaft control adapter 10, the phase angle of which position encoder is detected by the crankshaft position sensor 41, there are multiple tolerance chains that lead to deviations of the phase positions, hereinafter also referred to as phase differences, of reciprocating piston 6, inlet valves 22 and outlet valves 32 in relation to the ideal reference phase positions.

Here, the piston stroke phase difference $\Delta KH$ results for example from a deviation of the crankpin angle HZW, the so-called crankpin angle difference $\Delta HZW$, in relation to the reference position of the crankshaft position sensor 41 and from different dimensional tolerances (not illustrated) of connecting rod 7 and reciprocating piston 6. Furthermore, the inlet valve stroke phase difference $\Delta EVH$ results for example from a deviation in the cam position, the so-called inlet camshaft angle difference $\Delta ENW$, together with mechanical tolerances (not illustrated) of the inlet camshaft control adapter 24 and of the control mechanism 40. If a phase adjuster for the inlet camshaft is present, then consideration is possibly also given to an inlet camshaft adjustment angle ENVW or to a deviation thereof from the setpoint.

In the same way, the outlet valve stroke phase difference $\Delta AVH$ results for example from a deviation in the cam position, the so-called outlet camshaft angle difference $\Delta ANW$, together with mechanical tolerances (not illustrated) of the outlet camshaft control adapter 24 and of the control mechanism 40. If a phase adjuster for the outlet camshaft is present, then consideration is possibly also given to an outlet camshaft adjustment angle ANVW or to a deviation thereof from the setpoint. Possible causes of the described deviations may for example be:

manufacturing and/or assembly tolerances of the mechanical components involved, and wear phenomena, such as for example a lengthening of the control chain or of the toothed belt by means of which the crankshaft and the camshafts are coupled, and deformation phenomena, elastic or plastic, resulting from high mechanical load states.

The previous solution to the described problem as per the current prior art lies, in principle, in detecting and quantifying the occurring deviations between reference internal combustion engine and series-production internal combustion engine in order to be able to implement corresponding measures for correction or compensation through adaptation of control parameters. Furthermore, it has hitherto been sought to counteract this problem by minimizing manufacturing and assembly tolerances. Furthermore, for example, the control timing is measured on the respective static series-production internal combustion engine on the basis of valve stroke position, cam contour etc., and the internal combustion engine is correspondingly adjusted during the assembly process.

Most presently known systems operate with a reference point system (position feedback). Here, in each case one position mark that can be detected by means of a sensor is placed on the crankshaft and on the inlet camshaft and/or on the outlet camshaft, or also on the respective crankshaft control adapter and on the inlet camshaft control adapter and/or on the outlet camshaft control adapter, or also on a phase adjuster that may be provided, etc. In this way, the relative phase position between the crankshaft and the respective inlet camshaft and/or outlet camshaft can be determined, and deviations in relation to the desired reference values can be identified. The undesired effects of said deviations can then be counteracted in the control unit by means of an adaptation or correction of corresponding control parameters in a manner dependent on the determined deviations.

In principle, however, only some of the occurring tolerances can be identified by means of this method. For example, it is thus not possible to identify an angular deviation owing to a position deviation of the respective position marks themselves in relation to the camshafts, or an inlet camshaft angle difference ΔENW or an outlet camshaft angle difference ΔANW in relation to the respective reference position. Further methods, such as evaluating the knock sensor signal, evaluating the cylinder pressure signal, are likewise known.

U.S. Pat. No. 6,804,997 B1 has disclosed an engine control device for determining the phase position of the crankshaft by monitoring and evaluating pressure fluctuations in the intake tract. The control device is designed so as to determine intake air pressure fluctuations, which indicate an intake air event, and thus a crankshaft phase position related thereto and the corresponding period thereof in the engine cycle. The control device utilizes these items of information to determine the crankshaft rotational speed and the phase position of the crankshaft in order to control the fuel injection and the ignition characteristics of the engine. The control timings of the inlet and outlet valves, that is to say possibly inlet valve stroke phase differences and outlet valve stroke phase differences, are not taken into consideration in this case, and can under some circumstances considerably influence the result.

DE 10 2005 007 057 has disclosed a closed-loop control method for a throttle flap air stream, which is to be controlled in closed-loop fashion, in the intake tract of an internal combustion engine, wherein pressure pulsations in the intake tract, which are influenced inter alia also by the valve control timings of the internal combustion engine, are taken into consideration in the closed-loop control of the fluid stream. For this purpose, the pressure pulsations are analyzed by means of fast Fourier transformation, and the amplitude information is summarized in a distortion factor which is taken into consideration as an additional input variable for example for a multi-dimensional mathematical closed-loop control model of the throttle flap air stream. Specific conclusions regarding the valve control timings, that is to say also possibly present inlet valve stroke phase differences and outlet valve stroke phase differences, of the internal combustion engine cannot be drawn by means of this method.

DE 35 06 114 A1 has disclosed a method for the open-loop or closed-loop control of an internal combustion engine in which, in a manner dependent on an operating variable which comprises at least a part of an oscillation spectrum of the internal combustion engine as information, such as for example gas pressure signals, at least one manipulated variable of the internal combustion engine is controlled. For this purpose, from the detected operating variable, the value spectrum contained therein is determined, as a part of the oscillation spectrum, by discrete Fourier transformation and is used as a measurement spectrum and compared with a reference spectrum. That manipulated variable of the internal combustion engine which is to be controlled is then controlled in a manner dependent on the deviation between measurement spectrum and reference spectrum. Specific conclusions regarding the valve control timing and piston stroke position of the internal combustion engine cannot be easily drawn by means of this method either.

US 2009 0 312 932 A1 discloses a method for performing diagnosis on the combustion within an internal combustion engine, wherein a combustion phase setting value is generated from the crankshaft angular speed by means of a fast Fourier transformation, said value is compared with an expected combustion phase setting value, and differences between said values greater than an admissible combustion phase setting difference are identified. A similar approach for determining deviations between a reference engine and series-production engine to those described above is also disclosed in US 2010 0 063 775 A1.

SUMMARY

The present disclosure describes a simple and inexpensive method by means of which a particularly accurate identification of the actual phase positions of the inlet valves and of the outlet valves is possible, and/or the inlet valve stroke phase difference ΔEVH and the outlet valve stroke phase difference ΔAVH can be reliably determined during ongoing operation of the internal combustion engine. For example, some embodiments include a method for the combined identification of an inlet valve stroke phase difference and an outlet valve stroke phase difference of a cylinder of a series-production internal combustion engine during operation, wherein dynamic pressure oscillations, assignable to the cylinder, of the intake air in the air intake tract and/or of the exhaust gas in the exhaust-gas outlet tract of the respective series-production internal combustion engine are measured during operation and a corresponding pressure oscillation signal is generated from these, and wherein a crankshaft phase angle signal is determined at the same time, wherein, from the pressure oscillation signal, using discrete Fourier transformation, the amplitudes of selected signal frequencies of the measured pressure oscillations in relation to the crankshaft phase angle signal are determined, characterized by the following further steps: on the basis of the determined amplitudes of the respective selected signal frequencies, determining lines of equal amplitudes of the selected signal frequencies, which lines are dependent on inlet valve stroke phase difference and outlet valve stroke phase difference, using reference lines of equal amplitudes, which reference lines are stored in reference line characteristic maps or determined by means of a respective algebraic model function; determining a common intersection point of the determined lines of equal amplitudes of the selected signal frequencies by projection into a common plane spanned by inlet valve stroke phase difference and outlet valve stroke phase difference; and determining the inlet valve stroke phase difference and the outlet valve stroke phase difference from the determined common intersection point of the lines of equal amplitudes of the selected signal frequencies.

In some embodiments, the method also includes performing measurement on a reference internal combustion engine in order to determine reference lines of equal amplitudes of selected signal frequencies of the pressure oscillation signal in the inlet and/or outlet tract in a manner dependent on reference inlet valve stroke phase difference and reference outlet valve stroke phase difference, and storing the reference lines of equal amplitudes of the selected signal frequencies of the pressure oscillation signal in a manner dependent on reference inlet valve stroke phase difference and reference outlet valve stroke phase difference in reference line characteristic maps.

In some embodiments, the reference line characteristic maps are stored in a memory area of an engine control unit of the respective series-production internal combustion engine.

In some embodiments, from the reference line characteristic maps of the selected signal frequencies of the pressure oscillation signal, for the respective signal frequency, an algebraic model function is derived which replicates the profile of the respective reference lines of equal amplitudes of the selected signal frequencies of the pressure oscillation signal in a manner dependent on reference inlet valve stroke phase difference and reference outlet valve stroke phase difference.

In some embodiments, the algebraic model functions for the selected signal frequencies are stored in a memory area of an engine control unit of the respective series-production internal combustion engine.

In some embodiments, the projection of the lines of equal amplitudes into a common plane spanned by inlet valve stroke phase difference and outlet valve stroke phase difference, and the determination of the common intersection point of these lines, is performed on the basis of algebraic functions.

In some embodiments, the method is executed on an electronic programmable engine control unit of the respective series-production internal combustion engine.

In some embodiments, an adaptation of control variables or control routines in the context of a correction of or adaptation to the determined inlet valve stroke phase difference and the determined outlet valve stroke phase difference is performed on the engine control unit.

In some embodiments, the selected signal frequencies include the intake frequency and further multiples of the intake frequency of the internal combustion engine.

In some embodiments, the dynamic pressure oscillations of the intake air are measured by means of a series-production-type pressure sensor in the intake pipe of the air intake tract.

In some embodiments, the crankshaft phase angle signal is determined by means of a toothed gear connected to the crankshaft and by means of a Hall sensor.

BRIEF DESCRIPTION OF THE DRAWINGS

A detailed consideration of the relationships taught herein is presented below, with reference to the figures. In the figures.

DETAILED DESCRIPTION

When varying the inlet valve stroke phase difference $\Delta EVH$ and the outlet valve stroke phase difference $\Delta AVH$ on an "ideal" reference internal combustion engine and analyzing the pressure oscillation signal of the intake air in the air intake tract or of the exhaust gas in the exhaust-gas outlet tract, hereinafter referred to for short as pressure oscillation signal, by means of discrete Fourier analysis, and taking into consideration individual selected signal frequencies which corresponded in each case to the intake frequency or to a multiple of the intake frequency, it has been found that, in particular, the amplitudes of the individual selected signal frequencies, that is to say the amplitude level of the pressure oscillation signal in relation to a midline and the crankshaft phase angle signal, are dependent on the inlet valve stroke phase difference $\Delta EVH$ and on the outlet valve stroke phase difference $\Delta AVH$.

In some embodiments of a method for the combined identification of an inlet valve stroke phase difference and of an outlet valve stroke phase difference of a cylinder of a series-production internal combustion engine during operation, dynamic pressure oscillations, assignable to the respective cylinder, of the intake air in the air intake tract and/or of the exhaust gas in the exhaust-gas outlet tract of the respective series-production internal combustion engine are measured during operation and a corresponding pressure oscillation signal is generated in each case from these. At the same time, a crankshaft phase angle signal is determined. From the pressure oscillation signal, using discrete Fourier transformation, the amplitudes of selected signal frequencies of the measured pressure oscillations in relation to the crankshaft phase angle signal are determined.

In some embodiments, the method includes one or more of the following:
- On the basis of the determined amplitudes of the respective selected signal frequencies, lines of equal amplitude of the selected signal frequencies, which lines are dependent on inlet valve stroke phase difference and outlet valve stroke phase difference, are determined. This is performed using reference lines of equal amplitude, which reference lines are stored in reference line characteristic maps or determined by means of a respective algebraic model function;
- A common intersection point of the determined lines of equal amplitude of the selected signal frequencies is determined by projection into a common plane spanned by inlet valve stroke phase difference and outlet valve stroke phase difference; and
- The inlet valve stroke phase difference and the outlet valve stroke phase difference are determined from the determined common intersection point of the lines of equal amplitude of the selected signal frequencies.

A person skilled in the art will recognize all components that serve for the supply of air to the respective combustion chambers of the cylinders, and which thus define the so-called air path, may be referred to as an "air intake tract" or also simply "intake tract", "intake system", or "inlet tract" of an internal combustion engine. These may include for example an air filter, an intake pipe, intake manifold or distributor pipe or, for short, suction pipe, a throttle flap valve, and possibly a compressor and the intake opening in the cylinder or the inlet duct of the cylinder.

By contrast, the expression "exhaust-gas outlet tract" or, for short, "exhaust-gas tract" or "outlet tract" of the internal combustion engine characterizes those components which serve for the controlled discharge of the exhaust gas that emerges from the combustion chambers after the combustion.

For the analysis of the pressure oscillation signal, the latter is subjected to a discrete Fourier transformation (DFT). For this purpose, an algorithm known as a fast Fourier transformation (FFT) may be used for the efficient calculation of the DFT. By means of DFT, the pressure oscillation signal is now broken down into individual signal frequencies which can thereafter be separately analyzed in simplified fashion with regard to their amplitude and the phase position. In some embodiments, the amplitude of selected signal frequencies of the pressure oscillation signal are dependent on the valve control timings, relative to the crankshaft angle, of the internal combustion engine. The amplitude of a signal frequency in this case characterizes the relative amplitude level of the signal frequency signal in relation to a midline.

In some embodiments, without additional sensors, the phase positions, that is to say the present stroke positions of the inlet valves and of the outlet valves of the internal combustion engine, can be determined in relation to the crankshaft phase angle and with high accuracy and can thus be used for the accurate calculation of the charge exchange process and for the tuning of the control parameters of the internal combustion engine.

In some embodiments, the steps, which precede the above-described method according to the invention, of performing measurement on a reference internal combustion engine in order to determine reference lines of equal amplitude of selected signal frequencies of the pressure oscillation signal of the intake air in the air intake tract and/or of the exhaust gas in the exhaust-gas outlet tract in a manner dependent on reference inlet valve stroke phase difference and reference outlet valve stroke phase difference, and storing the reference lines of equal amplitude of the selected signal frequencies of the pressure oscillation signal in a manner dependent on reference inlet valve stroke phase difference and reference outlet valve stroke phase difference in reference line characteristic maps. In this way, the determination of the inlet valve stroke phase difference and the outlet valve stroke phase difference can be performed in a simple manner.

The abovementioned reference line characteristic maps may be stored in a memory area of an existing engine control unit of the respective series-production internal combustion engine, and thus immediately available for use in the abovementioned method during the operation of the series-production internal combustion engine, without the need for separate memory means. In some embodiments, from the reference line characteristic maps, determined as described above, of the selected signal frequencies of the pressure oscillation signal, the respective signal frequency, for an algebraic model function may be derived which replicates the profile of the respective reference lines of equal amplitude of the selected signal frequencies of the pressure oscillation signal in a manner dependent on reference inlet valve stroke phase difference and reference outlet valve stroke phase difference. In this way, a mathematical formulation of the reference lines of equal amplitude is made available, which can be used during the further method for the analytical determination of the common intersection point of the lines of equal amplitude and thus for the identification of the inlet valve stroke phase difference and of the outlet valve stroke phase difference.

In some embodiments, the algebraic model functions, determined as described above, for the selected signal frequencies may be stored in a memory area of an engine control unit of the respective series-production internal combustion engine. In this way, the algebraic model functions are immediately available in the controller and can be easily used for the respectively current determination of the lines of equal amplitude. It is thus not necessary to store corresponding reference line characteristic maps in the memory, which comprise large quantities of data and thus give rise to an increased memory space requirement.

In some embodiments, the projection of the determined lines of equal amplitude into a common plane spanned by inlet valve stroke phase difference and outlet valve stroke phase difference in order to determine a common intersection point, are performed on the basis of corresponding algebraic functions. For this purpose, the diagrammatic illustrations used in this patent application for an improved illustration of the method are converted into algebraic functions or processing operations. This is particularly advantageous in the case of the method being executed by means of an electronic, programmable processing unit, such as for example a corresponding engine control unit (CPU), on which the corresponding processing operations can be executed. Under the abovementioned assumption, the methods described herein can be executed on an electronic, programmable engine control unit of the respective series-production internal combustion engine. In some embodiments, no separate control or processing unit is necessary, and the algorithms of the method can be incorporated into the corresponding sequences of the engine control programs.

In some embodiments, an adaptation of control variables or control routines, for example the fuel mass for injection, the start time of the injection, the ignition time, the actuation of the phase adjusters of the camshafts, etc., in the context of a correction of or adaptation to the determined inlet valve stroke phase difference and the determined outlet valve stroke phase difference is performed in the engine controller. It is thus possible for the combustion process to be optimized for the real conditions of the respective series-production internal combustion engine, and thus for the fuel demand and the emissions values to be reduced.

In some embodiments, the selected signal frequencies advantageously correspond to the intake frequency as fundamental frequency or 1st harmonic and the further multiples, that is to say the 2nd to Xth of the so-called "harmonics" of the intake frequency of the internal combustion engine. In some embodiments, the intake frequency in turn uniquely relates to the rotational speed of the internal combustion engine. Then, for said selected signal frequencies, taking into consideration the crankshaft phase angle signal detected in parallel, the amplitude of the selected signal frequencies is determined in relation to the crankshaft phase angle. This yields particularly unique results, which are thus easy to evaluate, in the determination of the lines of equal amplitude, which thus results in high accuracy of the results.

In some embodiments, the dynamic pressure oscillations of the intake air in the air intake tract to be measured by means of a series-production-type pressure sensor, which is already provided in any case, in the intake pipe. This has the advantage that no additional sensor has to be provided for this purpose, and therefore no additional costs are incurred for executing the method according to the invention. The crankshaft phase angle signal required for the execution of the methods described herein can be determined by means of a toothed gear connected to the crankshaft and by means of a Hall sensor. Such a sensor arrangement is likewise already provided in modern internal combustion engines for other purposes. The crankshaft phase angle signal generated by means of said sensor arrangement can be easily jointly utilized by the method according to the invention. This has the advantage that no additional sensor has to be provided, and therefore no additional costs are incurred for executing the methods described herein.

Figure 3:
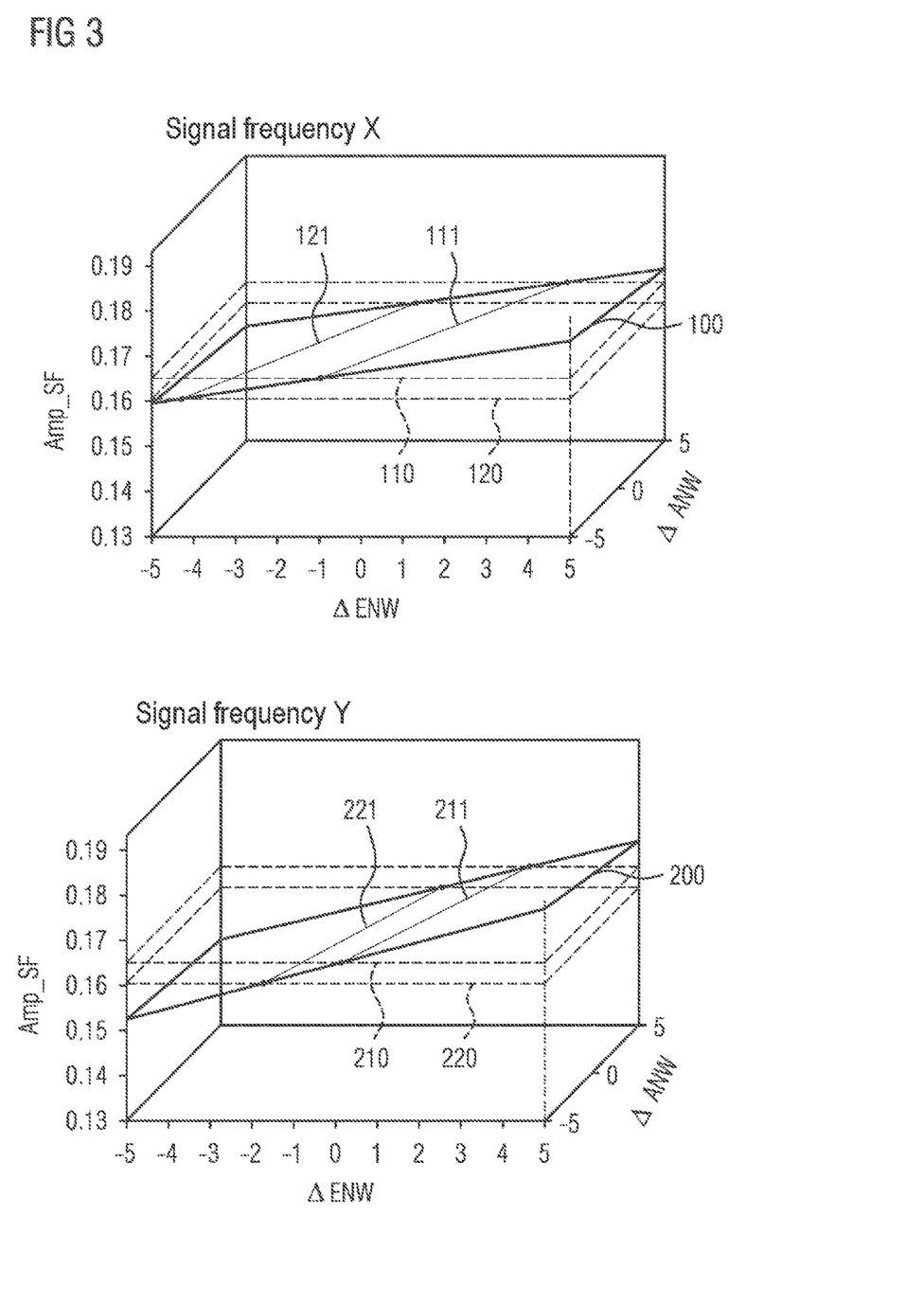
FIG. 3 shows two three-dimensional diagrams for illustrating the dependency of the amplitude (Amp SF) of two selected signal frequencies X and Y of the pressure oscillation signal measured in the air intake tract and/or exhaust-gas outlet tract on the inlet camshaft angle difference and the outlet camshaft angle difference.

FIG. 3 illustrates this dependency for two different signal frequencies, the intake frequency, signal frequency X, and the first harmonic, signal frequency Y. For the variation of the inlet valve stroke phase difference $\Delta$EVH and of the outlet valve stroke phase difference $\Delta$AVH, a respective phase adjuster was used for this purpose to vary the inlet camshaft angle difference $\Delta$ENW and the outlet camshaft angle difference $\Delta$ANW in the range between $-5°$ and $+5°$, and the respectively associated amplitude of the respective signal frequency Amp_SF of the pressure oscillation signal was plotted vertically above the $\Delta$ENW-$\Delta$ANW plane thus spanned.

Under ideal circumstances, there is a direct and unique relationship between inlet camshaft angle difference $\Delta$ENW and inlet valve stroke phase difference $\Delta$EVH and between outlet camshaft angle difference $\Delta$ANW and outlet valve stroke phase difference $\Delta$AVH. For every selected signal frequency, there is thus a resulting, differently inclined "amplitude surface" 100, 200 in the spanned three-dimensional space. If section planes 110, 120, 210, 220 lying parallel to the $\Delta$ENW-$\Delta$ANW plane are now laid at the level of different amplitudes Amp_SF of the respective signal frequency, one obtains respective lines of intersection with the respective "amplitude surface" 100, 200, which lines can be referred to as lines of equal amplitude. That is to say, for all $\Delta$ENW-$\Delta$ANW combinations lying along such a line of equal amplitude, one obtains the same amplitude of the selected frequency of the pressure oscillation signal. Conversely, this means that a determined amplitude of a signal frequency of the pressure oscillation signal cannot be assigned a unique $\Delta$ENW-$\Delta$ANW combination.

FIG. 3 shows, in the case of signal frequency X, the phase surface 100 and, by way of example, two section planes 110, 120 at amplitude 0.165 and 0.160. The line of equal amplitude 111 is obtained for amplitude 0.165, and the line of equal amplitude 121 is obtained for amplitude 0.160. In the case of signal frequency Y, the phase surface 200 and, by way of example, two section planes 210, 220 at amplitude 0.165 and 0.160 respectively are shown. The line of equal amplitude 211 is obtained for amplitude 0.165, and the line of equal amplitude 221 is obtained for amplitude 0.160.

For the further examination of the relationships, the lines of equal amplitude of each selected signal frequency of the pressure oscillation signal have now been projected into the $\Delta$ENW-$\Delta$ANW plane. This is illustrated separately for signal frequency X and signal frequency Y in FIG. 4, analogously to FIG. 3. The corresponding lines of equal amplitude 111, 121 for signal frequency X and also 211, 221 for signal frequency Y have been denoted by corresponding reference designations in this illustration too. It can be seen that the lines of equal amplitude of the different selected signal frequencies have different gradients. If one projects the lines of equal amplitude of the different selected signal frequencies into the $\Delta$ENW-$\Delta$ANW plane one above the other, as illustrated in FIG. 5 on the basis of lines of equal amplitude 121 and 221, it can be seen that the lines of equal amplitude of the different signal frequencies X and Y intersect at exactly one intersection point 300 which thus represents a single $\Delta$ENW-$\Delta$ANW combination. Since, taking an ideal reference engine as a basis, a direct and uninfluenced interaction of the inlet camshaft 23 with the inlet valves 22 and of the outlet camshaft 33 with the outlet valves 32 can be assumed, i.e. a direct and unique relationship exists, an inlet camshaft angle difference $\Delta$ENW can be assigned a specific inlet valve stroke phase difference $\Delta$EVH, and the outlet camshaft angle difference $\Delta$ANW can be assigned a specific outlet valve stroke phase difference $\Delta$AVH.

Thus, if one assumes otherwise ideal relationships, then it is thus possible, by determining the amplitude of at least two selected signal frequencies of the pressure oscillation signal, and taking into consideration and superposing the known lines of equal amplitude of the determined amplitudes of the respective signal frequency by projection into a common $\Delta$EVH-$\Delta$AVH plane, to determine the single intersection point of the lines of equal amplitude, and from this to determine the value of the inlet valve stroke phase difference $\Delta$EVH and of the outlet valve stroke phase difference $\Delta$AVH. In the example illustrated in FIG. 5, it is thus possible, along the arrows plotted using dashed lines proceeding from the intersection point 300, to determine an outlet camshaft angle difference $\Delta$ANW of $-2°$ and an inlet camshaft angle difference $\Delta$ENW of $0°$.

Figure 4:
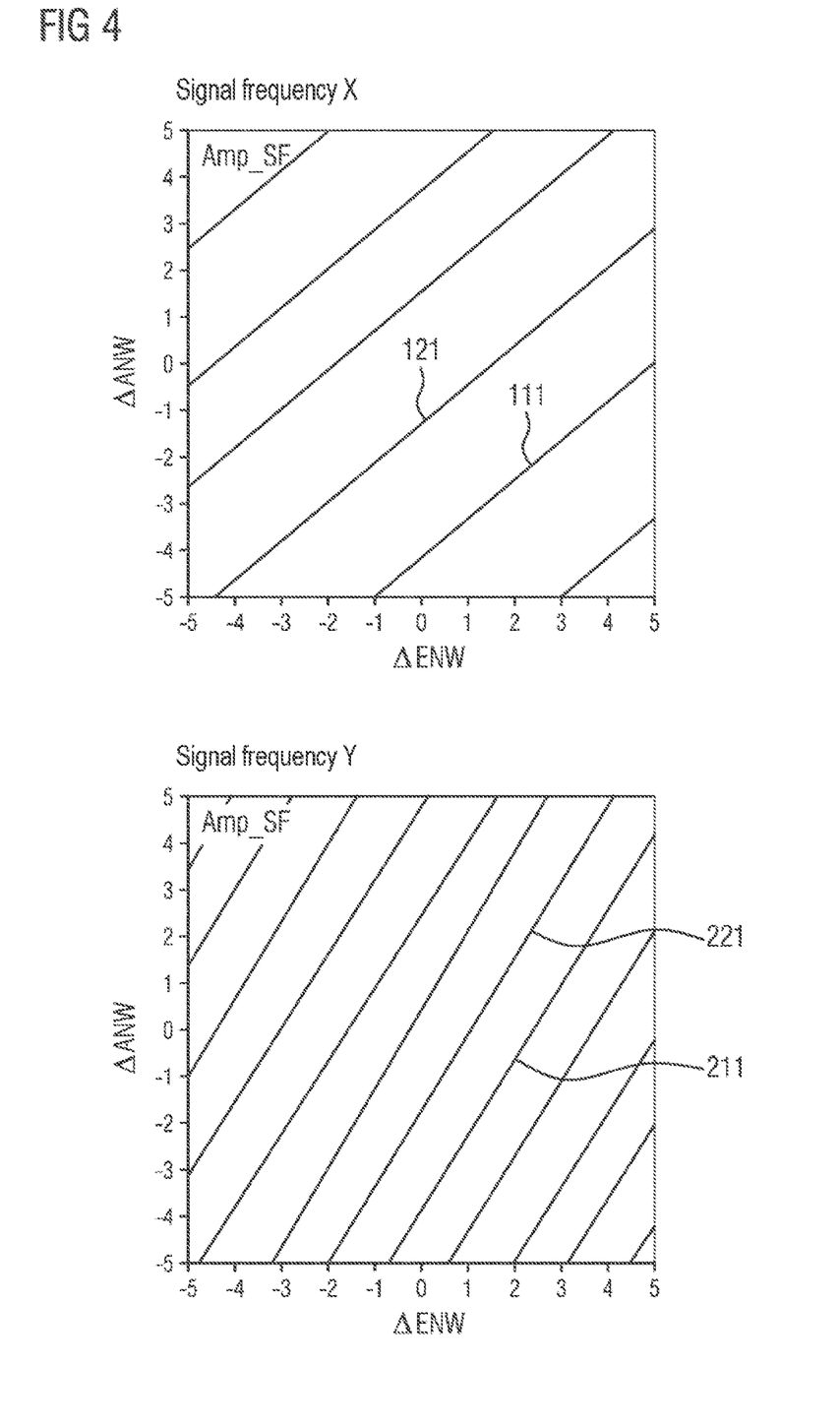
FIG. 4 shows two two-dimensional diagrams for illustrating lines of equal amplitude for two selected signal frequencies X and Y of the pressure oscillation signal measured in the air intake tract and/or exhaust-gas outlet tract, projected into a plane spanned by the inlet camshaft angle difference and the outlet camshaft angle difference.
Figure 5:
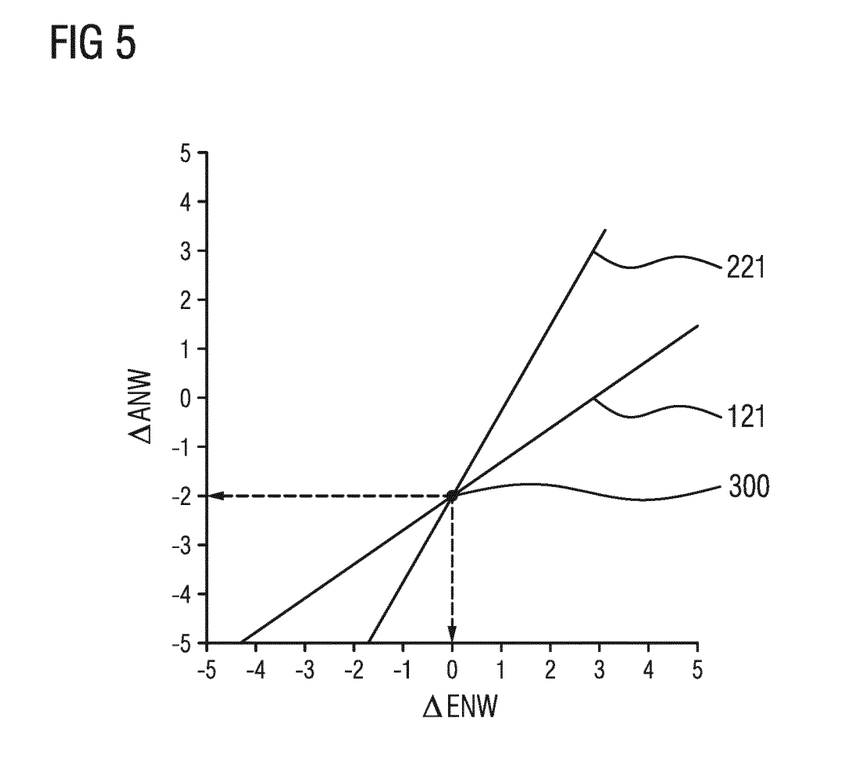
FIG. 5 shows a two-dimensional diagram as per FIG. 4 with plotted lines of equal amplitude of different signal frequencies for a particular combination of inlet camshaft angle difference and of the outlet camshaft angle difference.

The relationships graphically illustrated in FIGS. 3 to 5 serve for ease of understanding of the principles of the methods described herein. Said relationships may also be represented on the basis of corresponding algebraic formulations, and the method may be executed on this basis by means of corresponding processing operations and program algorithms for example on a programmable digital control unit. For this purpose, mathematical-physical model functions corresponding for example to the illustration of the lines of equal amplitude are derived, which model functions can be used for the determination of the common intersection point.

The methods for the combined identification of an inlet valve stroke phase difference $\Delta$EVH and of an outlet valve stroke phase difference $\Delta$AVH of an internal combustion engine during operation is based on the realizations presented above, and is accordingly presented, in one example, as follows:

During the operation of the internal combustion engine, the dynamic pressure oscillations of the intake air in the air intake tract or of the exhaust gas in the exhaust-gas outlet tract, or else in both regions, are measured continuously. The respective measurement results in a pressure oscillation signal. At the same time, a crankshaft phase angle signal is detected by sensor means. The pressure oscillation signal and the crankshaft phase angle signal are supplied to a control unit 50 of the internal combustion engine 1 via corresponding signal inputs 51. In the control unit 50, the pressure oscillation signal is subjected, by means of program algorithms stored therein, to a discrete Fourier transformation, and the respective amplitude of selected signal frequencies, preferably of the first and further harmonics of the intake frequency of the internal combustion engine, of the measured pressure oscillations in relation to the crankshaft phase angle signal is determined.

Subsequently, for the individual selected signal frequencies, on the basis of the respective amplitude, in each case one corresponding line of equal amplitude is determined. This is performed in each case either by selection of a reference line of equal amplitude from a reference line characteristic map which is typical for the corresponding internal combustion engine series and which is stored in a memory area of the control unit 50, or by calculation by means of a respective algebraic model function, which is typical for the corresponding internal combustion engine series and which is stored in a memory area of the control unit, and corresponding processing operations and program algorithms.

The thus determined lines of equal amplitude of the individual selected signal frequencies are then, by means of corresponding program algorithms stored in the control unit, projected into a common plane spanned by inlet valve stroke phase difference $\Delta$EVH and outlet valve stroke phase difference $\Delta$AVH, and thus brought to a common intersection point. From the position of said common intersection point in the plane spanned by inlet valve stroke phase difference $\Delta$EVH and outlet valve stroke phase difference $\Delta$AVH, it is then possible to determine the inlet valve stroke phase difference $\Delta$EVH and outlet valve stroke phase difference $\Delta$AVH.

For the execution of the method, specific characteristic maps with reference lines of equal amplitude or corresponding algebraic model functions may be used. These are dependent on the type of construction and the detailed structural design of the type series/series of an internal combustion engine and may therefore be determined on a structurally identical reference internal combustion engine that is typical of the series. For this purpose, on the reference internal combustion engine, the pressure oscillation signal in the air intake tract and/or in the exhaust-gas outlet tract is recorded at the greatest possible number of operating points, with variation of the inlet valve stroke phase difference $\Delta$EVH and of the outlet valve stroke phase difference $\Delta$AVH, and is subjected to a discrete Fourier transformation, and the amplitudes for the selected signal frequencies are stored in a manner dependent on the inlet valve stroke phase difference $\Delta$EVH and on the outlet valve stroke phase difference $\Delta$AVH. It must be ensured here that no piston stroke phase difference $\Delta$KH is superposed on and falsifies the results.

On the basis of these three-dimensional data maps thus determined, it is then possible, for the individual selected signal frequencies, for the lines of equal amplitude to be determined and stored in corresponding characteristic maps, or for the algebraic model functions for the calculation of the lines of equal amplitude to be determined. The characteristic maps and/or model functions thus determined are then stored in a memory area of a control unit of every structurally identical series-production internal combustion engine and can be used for executing the methods described herein.

Figure 6:
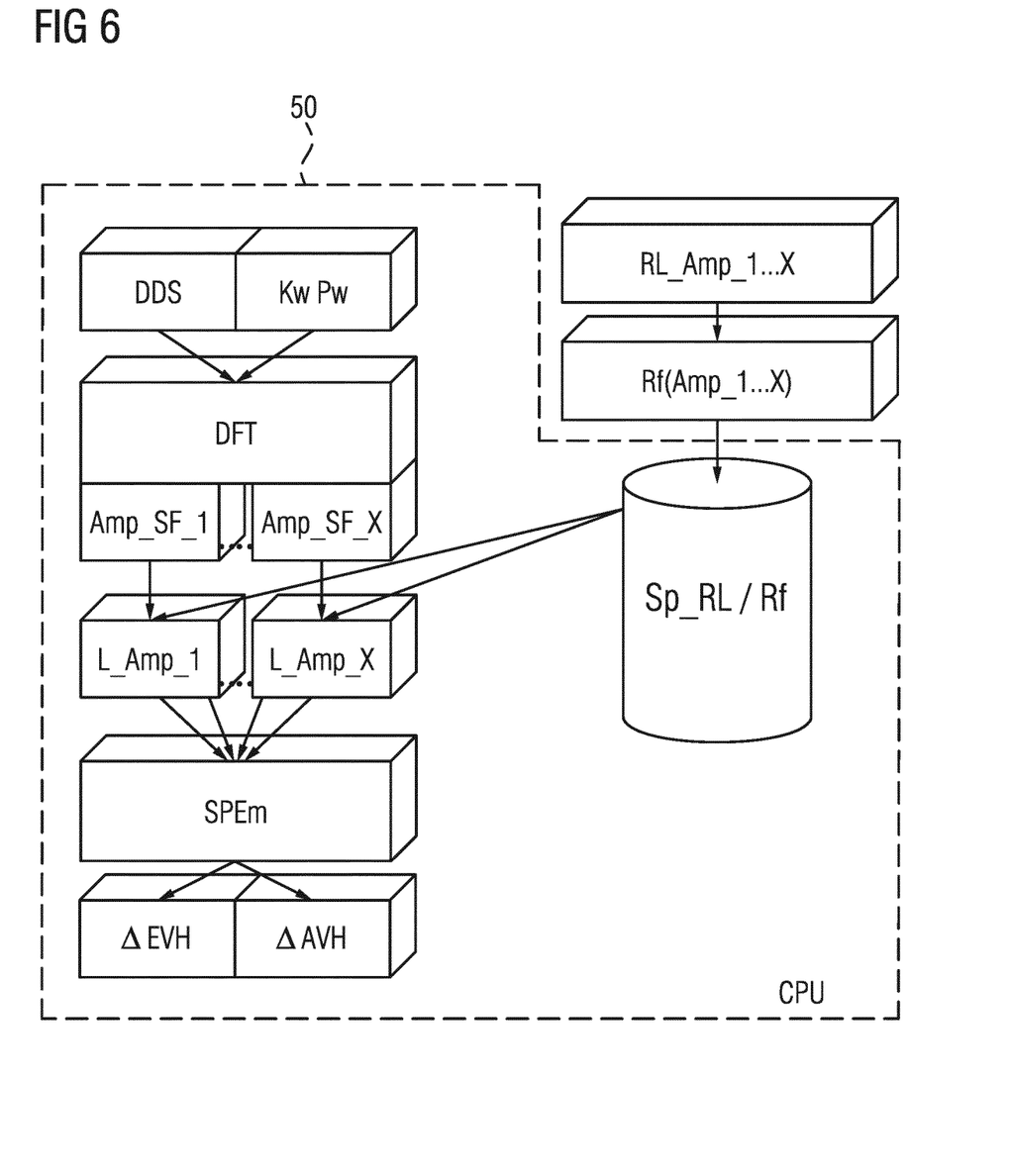
FIG. 6 shows a simplified block diagram for illustrating an example method incorporating the teachings herein.

FIG. 6 illustrates an example embodiment of a method incorporating the teachings herein for the combined identification of an inlet valve stroke phase difference $\Delta$EVH and of an outlet valve stroke phase difference $\Delta$AVH of a cylinder of a series-production internal combustion engine 1 during operation, once again in the form of a simplified block diagram showing the major steps. At the start, dynamic pressure oscillations, assignable to the respective cylinder, of the intake air in the air intake tract and/or of the exhaust gas in the exhaust-gas outlet tract of the respective series-production internal combustion engine are measured during operation and a corresponding pressure oscillation signal is generated from these, and a crankshaft phase angle signal is determined at the same time, as illustrated by the blocks which are arranged in parallel and which are labelled DDS (dynamic pressure oscillation signal) and KwPw (crankshaft phase angle). Then, from the pressure oscillation signal (DDS), using discrete Fourier transformation (DFT), the amplitude of multiple selected signal frequencies (Amp_SF_1 ... Amp_SF_X) of the measured pressure oscillations in relation to the crankshaft phase angle signal (KwPw) are determined, which is illustrated by means of the blocks labelled DFT (discrete Fourier transformation) and Am_SF_1 to Amp_SF_X (amplitude of the respective signal frequency).

Then, on the basis of the determined amplitudes (Amp_SF_1 ... Amp_SF_X) of the respective selected signal frequency, in each case one line of equal amplitude L_Amp_1 ... L_Amp_X of the respectively same signal frequency, which line is dependent on inlet valve stroke phase difference and outlet valve stroke phase difference, is determined, as illustrated by means of the correspondingly labelled blocks. This is performed using reference lines of equal amplitude RL-Amp_1 ... X of the respective signal frequency, which reference lines are stored in reference line characteristic maps or determined by means of a respective algebraic model function. For this purpose, in the diagram in FIG. 6, a memory labelled Sp_RL/Rf is illustrated, from which the reference lines of equal amplitude RL_Amp_1 ... X, or else corresponding algebraic model functions Rf(Amp_1 ... X), provided therein can be accessed for the purposes of determining said lines.

Subsequently, one respective common intersection point of the determined lines of equal amplitude L_Amp_1 ... L_Amp_X is then determined by projection into a common plane spanned by inlet valve stroke phase difference and outlet valve stroke phase difference, as illustrated by the block labelled SPEm (intersection point determination).

Finally, from the determined intersection point of the lines of equal amplitude L_Amp_1 ... L_Amp_X of the selected signal frequencies, the inlet valve stroke phase difference $\Delta$EVH and the outlet valve stroke phase difference $\Delta$AVH are determined. This is illustrated by the blocks correspondingly labelled in FIG. 6.

Furthermore, FIG. 6 shows the steps, which precede the above-described method, of performing measurement on a reference internal combustion engine in order to determine reference lines of equal amplitudes RL_Amp_1 ... X of selected signal frequencies of the pressure oscillation signal in the air intake tract and/or of the exhaust gas in the exhaust-gas outlet tract in a manner dependent on reference inlet valve stroke phase difference and reference outlet valve stroke phase difference, and storing the reference lines of equal amplitudes of the selected signal frequencies of the pressure oscillation signal in each case in a manner dependent on reference inlet valve stroke phase difference and reference outlet valve stroke phase difference in reference line characteristic maps, as is symbolically illustrated by the block labelled RL_Amp_1 ... X.

The block labelled Rf(Amp_1 ... x) comprises the derivation of algebraic model functions which, as reference line functions of equal amplitude Rf(Amp_1) ... Rf(Amp_X), replicate the profile of the respective reference lines of equal amplitude of the selected signal frequencies of the pressure oscillation signal in a manner dependent on the reference inlet valve stroke phase difference and reference outlet valve stroke phase difference, on the basis of the previously determined reference line characteristic maps.

The reference line characteristic maps or reference line functions of equal amplitude are then stored in a memory area Sp_RL/Rf of an engine control unit 50, CPU of the respective series-production internal combustion engine, where they are available for the execution of the method according to the invention as discussed above. The border shown by dashed lines around the corresponding blocks in the block diagram symbolically represents the boundary between an electronic programmable engine control unit 50, CPU of the respective series-production internal combustion engine, on which the method is executed.

What is claimed is:

1. A method for analyzing a cylinder of a series-production internal combustion engine during operation, the method comprising:
   measuring dynamic pressure oscillations, associated with the cylinder, of at least one of (a) intake air in an air intake tract of the series-production internal combustion engine during operation or (b) exhaust gas in an exhaust-gas outlet tract of the series-production internal combustion engine during operation;
   generating a pressure oscillation signal based on the measured dynamic pressure oscillations;
   determining a crankshaft phase angle signal corresponding in time to the measured dynamic pressure oscillations;
   applying a discrete Fourier transformation to the pressure oscillation signal so as to determine amplitudes of a plurality of signal frequencies of the measured dynamic pressure oscillations in relation to the crankshaft phase angle signal;
   determining at least two respective constant-amplitude lines corresponding to at least two signal frequencies of the plurality of signal frequencies using stored reference line data or stored algebraic functions, wherein each of the at least two constant-amplitude lines are of equal amplitude;
   projecting the at least two constant-amplitude lines onto a common plane and determining an intersection point of the at least two projected constant-amplitude lines; and
   determining an inlet valve stroke phase difference and an outlet valve stroke phase difference of the cylinder based on the determined intersection point; and
   adjusting at least one control parameter of the series-production internal combustion engine based on the determined inlet valve stroke phase difference and outlet valve stroke difference.

2. The method as claimed in claim 1, further comprising:
   measuring dynamic pressure oscillations, associated with a reference cylinder, of at least one of (a) intake air in a reference air intake tract of a reference internal combustion engine or (b) exhaust gas in an exhaust-gas outlet tract of the reference internal combustion engine so as to determine respective reference constant-amplitude lines corresponding to a plurality of reference signal frequencies of a pressure oscillation signal generated based on the measured dynamic pressure oscillations as a function of reference inlet valve stroke phase difference values and reference outlet valve stroke phase difference values; and
   storing the reference constant-amplitude lines in reference line characteristic maps.

3. The method as claimed in claim 2, wherein the reference line characteristic maps are stored in a memory area of an engine control unit of the series-production internal combustion engine.

4. The method as claimed in claim 2, further comprising deriving an algebraic function from the reference line characteristic maps, which algebraic function represents a profile of the reference constant-amplitude lines, as a function of the reference inlet valve stroke phase difference values and the reference outlet valve stroke phase difference values.

5. The method as claimed in claim 4, wherein the derived algebraic function is stored in a memory area of an engine control unit of the series-production internal combustion engine.

6. The method as claimed in claim 1, wherein the projecting of the at least two constant-amplitude lines and the determining of the intersection point are performed based on the stored algebraic functions.

7. The method as claimed in claim 1, wherein the method is executed on an electronic programmable engine control unit of the series-production internal combustion engine.

8. The method as claimed in claim 7, wherein the engine control unit executes a correction to the inlet valve stroke phase difference and the outlet valve stroke phase difference.

9. The method as claimed in claim 1, wherein the plurality of signal frequencies include a first signal frequency and multiples of the first signal frequency.

10. The method as claimed in claim 1, wherein the dynamic pressure oscillations are measured by a series-production-type pressure sensor.

11. The method as claimed in claim 1, wherein the crankshaft phase angle signal is determined using a toothed gear connected to the crankshaft, and a Hall sensor.

* * * * *